United States Patent [19]

Nakamura

[11] Patent Number: 4,942,578
[45] Date of Patent: Jul. 17, 1990

[54] BUFFER CONTROL METHOD AND APPARATUS

[75] Inventor: Kouji Nakamura, Hadano, Japan

[73] Assignee: Hitachi, Ltd., Tokyo, Japan

[21] Appl. No.: 215,036

[22] Filed: Jul. 5, 1988

[30] Foreign Application Priority Data

Jul. 6, 1987 [JP] Japan .................................. 62-167107

[51] Int. Cl.⁵ ............................................. G06F 11/00
[52] U.S. Cl. ...................................... 371/36; 371/40.1
[58] Field of Search ....................... 371/40.2, 36, 40.1, 371/40.4, 44; 364/200, 900

[56] References Cited

U.S. PATENT DOCUMENTS

| | | | |
|---|---|---|---|
| 4,394,731 | 7/1983 | Flusche et al. | 364/200 |
| 4,400,770 | 8/1983 | Chan et al. | 364/200 |
| 4,748,594 | 5/1988 | Iida | 371/36 |
| 4,761,782 | 8/1988 | Lin | 371/36 |
| 4,791,642 | 12/1988 | Taylor | 371/40.2 |

Primary Examiner—Michael R. Fleming
Attorney, Agent, or Firm—Fay, Sharpe, Beall, Fagan, Minnich & McKee

[57] ABSTRACT

A multiprocessor stores in a directory a validity bit for a line of a cache, history of updating and information relating to equality of data between processors. A portion of an error in the information bits in an IC chip is recovered by a circuit for detecting an unauthorized combination of information bits, a circuit for guaranteeing correctness of one of bits and a correction circuit.

8 Claims, 3 Drawing Sheets

BUFFER CONTROL METHOD AND APPARATUS

BACKGROUND OF THE INVENTION

The present invention relates to a multi-processor system, and more particularly to a buffer control system suitable for use in a system having a cache or buffer memory in each processor.

A technique to provide a cache memory and a cache directory having a plurality of line entries corresponding to a plurality of line positions corresponding to line positions of the cache memory, in each processor of a multi-processor system and have each line entry hold an exclusive bit, a change bit and a validity bit is described in U.S. Pat. Nos. 4,394,731 and 4,400,770.

Each processor in the multi-processor system having a cache memory or buffer memory therein is provided with an exclusive bit in a buffer directory for determining whether it is necessary to cancel the content of the buffer in another processor during a write mode. As a result, the frequency of cancelling the buffer in the multi-processor system is reduced and a system performance is enhanced.

An effect of the exclusive bit is as follows. If a line in the buffer in each processor of the multi-processor system is not stored in the buffer of another processor, the exclusive bit is "1", and if there is a possibility that the line is stored in the buffer of another processor, the exclusive bit is "0". When data is to be written in the line, the exclusive bit is examined and only if the exclusive bit is "0", it is necessary to start buffer cancellation to the other processor. If the exclusive bit is "1", it is assured that a copy of that line is not stored in the buffer of the other processor and hence the processor does not start the buffer cancellation to the other processor.

When data is to be written into the line having the "0" exclusive bit, the buffer cancellation of the other processor is effected and after the assurance that there is no copy of the same line in the buffer of the other processor, the exclusive bit is set to "1".

However, the prior art system did not pay attention to detection of errors in the exclusive bit and the change bit which indicates a write status of the buffer and error recovery when the error is detected. In the prior art system, in order to detect the error in the exclusive bit or change bit, it is necessary to provide a parity bit for each of the exclusive bit and change bit or multiplex the exclusive bit and change bit. In order to recover the error, it is necessary to triplex the system and use a majority logic, or add error checking and correction code (ECC).

In the prior art system, a quantity of information to be held for the detection of error and the recovery of the error of the exclusive bit and change bit increases, and a theory for detecting and recovering the effect is complex.

SUMMARY OF THE INVENTION

It is an object of the present invention to provide a buffer control system which solves the problems encountered in the prior art system, does not increase the amount of information which should be held for detecting and recovering error, and can detect and recover the error in the exclusive bit or change bit without making the theory of error detection and recovery complex. The error may include an intermittent error (which is recoverable) due to radiation of an α-ray into an IC chip and a solid error (which is irrecoverable) due to short circuit in the IC chip.

It is another object of the present invention to provide a buffer control system which assures correctness of at least one of the validity bit, exclusive bit and change bit and in which the detection and recovery of error in other bit can be effected by simple logic without using complex logic which requires a large amount of information.

It is another object of the present invention to provide a buffer control system which has error recovery logic for the exclusive bit and change bit can check validity of error detection and error recovery.

In accordance with the present invention, the above objects are accomplished by checking validity of a combination of the change bit and the exclusive bit in a directory provided in each processor of the multi-processor system.

The change bit in the directory is set when data is written into a line of the buffer. When the data is written, buffer cancellation to another processor is necessarily effected, and after it has been confirmed that the same line is not in the buffer of the other processor, the exclusive bit in the directory corresponding to that line is set to "1". The change bit and the exclusive bit are set and reset with a predetermined correlation. Thus, if the correctness of one bit is assured, the error in the exclusive bit or the change bit can be detected by checking the validity of the bits in accordance with the correlation between the change bit and the exclusive bit. Further, when the error is detected, the value to be assumed by the exclusive bit or the change bit can be determined and the error can be recovered.

DESCRIPTION OF THE PREFERRED EMBODIMENTS

One embodiment of a buffer control system of the present invention is explained in detail with reference to the drawings.

Figure 1:
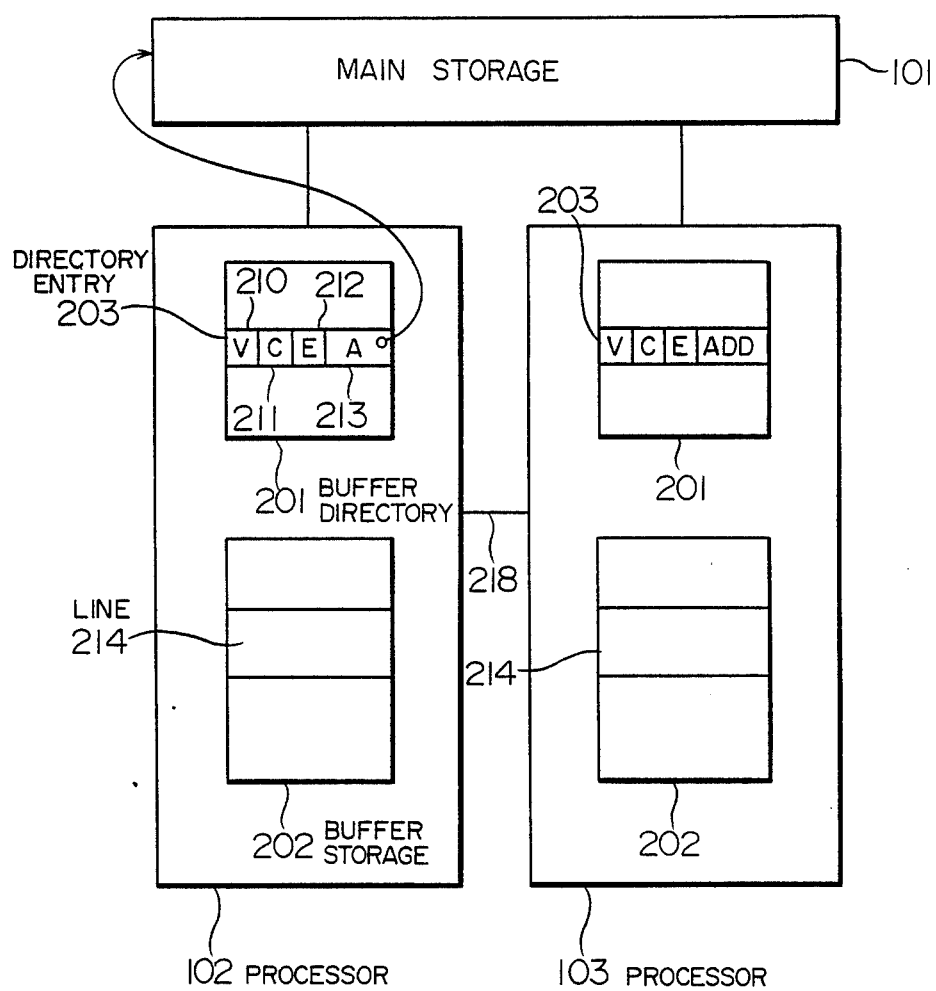
FIG. 1 shows a system configuration of one embodiment of the present invention.
Figure 2:
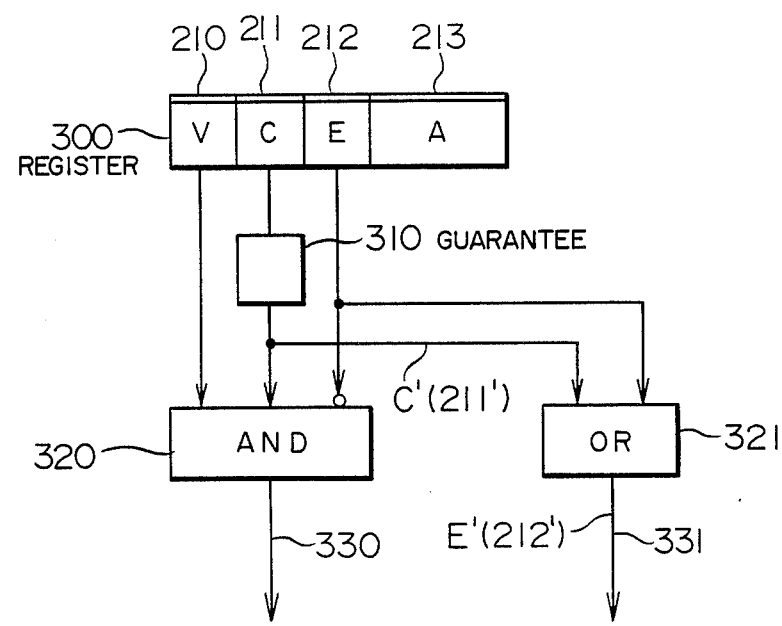
FIG. 2 shows a logic diagram for detecting and recovering an error in an exclusive bit.

FIG. 1 shows a system configuration of one embodiment of the present invention, and FIG. 2 shows a logic diagram for detecting and recovering the exclusive bit. In FIGS. 1 and 2, numeral 101 denotes a main storage, numerals 102 and 103 denote processors, numeral 201 denotes a buffer directory, numeral 202 denotes a buffer storage, numeral 300 denotes a directory read register which holds a content of a directory 203, numeral 310 denotes an error detection/recovery (guarantee) circuit for the change bit, numeral 320 denotes an AND gate and numeral 321 denotes an OR gate.

In the present embodiment of the system of the present invention, two processors 102 and 103 are connected to the main storage 101, as shown in FIG. 1. Each of the processors 102 and 103 have a buffer directory 201 and a store-in type buffer storage 202. An entry 203 of the buffer directory 201 comprises a validity bit (V) 210 for indicating whether a line 214 in the buffer storage 202 corresponding to the entry is valid or not, a change bit (C) 211 for indicating whether data has been written into the line 214 or not, an exclusive bit (E) 212 for indicating whether a copy of the line 214 is validly present in the buffer storage 202 in another processor or not and a main memory address (A) 213 for indicating an address in the main storage 101 whose data corresponds to the line 214.

The validity bit (V) 210, change bit (C) 211 and exclusive bit (E) 212 have the following meanings when they are "1" and "0", respectively.

(a) When the validity bit (V) 210 is "0", it means invalidity, that is, no usable data is stored in the corresponding line of the buffer storage 202.

(b) When the validity bit (V) 210 is "1", it means validity, that is, usable data is stored in the corresponding line of the buffer storage 202.

(c) When the change bit (C) 211 is "0", it means that data has not been written into the corresponding line.

(d) When the change bit (C) 211 is "1", it means that data has been written into the corresponding line.

(e) When the exclusive bit (E) 212 is "0", it means that a copy of the data of the line may be possibly present in the buffer storage of another processor.

(f) When the exclusive bit (E) 212 is "1", it means that a copy of data of the line is not present in the buffer storage of another processor.

Since the change bit (C) 211 and the exclusive bit (E) 212 are set and reset with certain correlation, the combinations include possible combinations and impossible combinations.

Table 1 shows the combinations of the exclusive bit (E) 212 and the change bit (C) 211 and whether the combinations are possible or impossible. In Table 1, a symbol o indicates a possible combination and a symbol x indicates an impossible combination.

TABLE 1

| Change Bit C | Exclusive Bit E | |
|---|---|---|
| | "0" Data is possibly present in other processor | "1" Data is not present in other processor |
| "0" (no write) | o | o |
| "1" (write) | x | o |

If data is being written into the buffer storage 202 in one processor, the change bit (C) 211 in the entry 203 of the buffer directory 201 corresponding to that line is set to "1" and the processor instructs the buffer cancellation to the other processor and sets the exclusive bit (E) 212 of its own entry 203 to "1". Thus, a combination of the "1" change bit (C) 211 and the "0" exclusive bit (E) 212 is impossible.

Thus, if the impossible combination of the change bit (C) 211 and the exclusive bite (E) 212 is detected, it is possible to detect the occurrence of an error in the exclusive bit under a guaranteed condition that the change bit (C) 211 is correct. By correcting the exclusive bit to "1", the error can be recovered.

FIG. 2 shows logic for detecting and recovering the error in the exclusive bit. The logic is explained below.

In FIG. 2, a directory read register 300 holds the content of the entry 203 of the buffer directory 201 in the processor shown in FIG. 1, that is, the validity bit (V) 210, change bit (C) 211, exclusive bit (E) 212 and main storage address (A) 213. In order to guarantee the correctness of the change bit (C) 211 read from the directory read register 300, it is supplied to a logic circuit 310 which may be a conventional majority logic circuit or an ECC circuit. The correctness guaranteed change bit supplied from the guarantee logic 310, the validity bit (V) 210 in the register 300 and an inverted bit of the exclusive bit (E) 212 are applied to an AND gate 320 where they are used to detect the error in the exclusive bit (E) 212. If the validity bit (V) 210 is "1" and the combination of the change bit (C) 211 and the exclusive bit (E) 212 is "10", the AND gate 320 detects that the exclusive bit (E) 212 is in error and produces an error detection signal 330. An OR gate 321 receives the corrected guaranteed change bit (C') 211 to produce an exclusive bit (E') 212' which is an error-correction version of the exclusive bit (E) 212, as a signal 331. When the combination of the change bit (C) 211 and the exclusive bit (E) 212 is "10", a logical OR of those bits is the error-corrected exclusive bit (E) 212.

Accordingly, the detection and recovery of the error in the exclusive bit can be effected by the simple logic as shown in FIG. 2 without using complex logic which requires the holding of a large amount of information. In the present embodiment, the error in the exclusive bit is detected and corrected with the guarantee of the correctness of the change bit. By guaranteeing the correctness of the exclusive bit by using the correlation of the exclusive bit and the change bit, the error in the change bit can be detected and recovered.

In this case, the change bit correctness guarantee logic 310 of FIG. 2 may be omitted and an exclusive bit error detection and recovery logic for guaranteeing the correctness of the exclusive bit (E) 212 is provided between the exclusive bit of the register 300 and the AND gate 320.

Figure 3A:
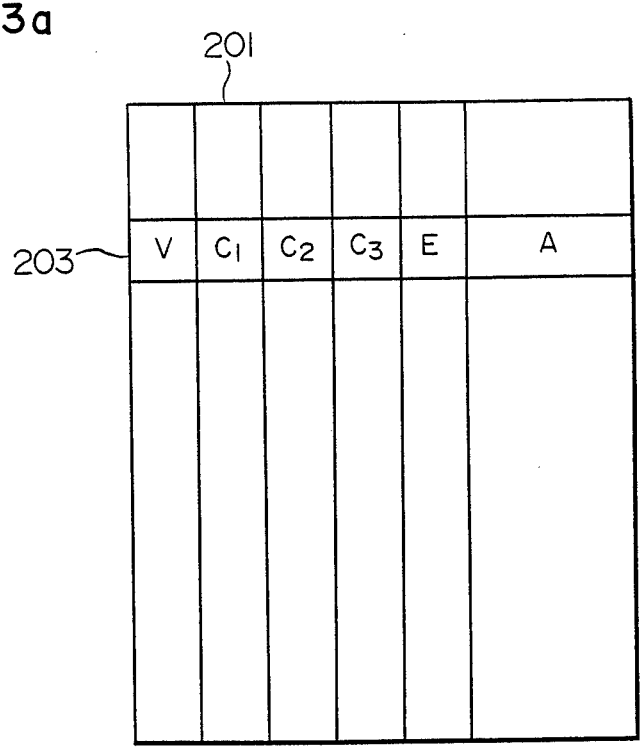
FIGS. 3a and 3b show a circuit for assuring validity of a change bit.
Figure 3B:
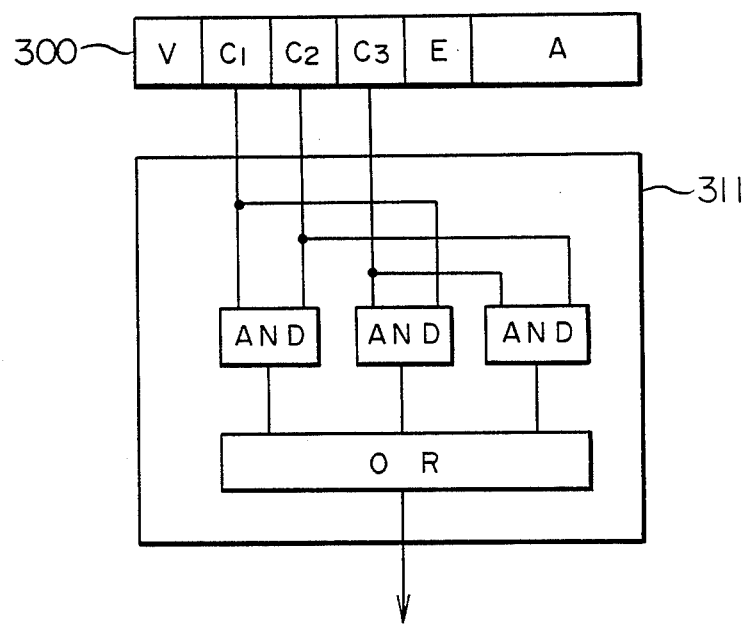

FIGS. 3a and 3b show an embodiment which uses a majority logic circuit as the guarantee circuit 310 in the first embodiment.

Change bits ($C_1$, $C_2$ and $C_3$) of the same value are provided in each directory in place of the change bit (C). A register 301 shown in FIG. 3b also holds three changes bits $C_1$, $C_2$ and $C_3$ in place of the change bit C. The majority logic comprises three two-input AND logics having their outputs connected to a three-input OR logic to recover an error in one of three bits. The validity guaranteed change bit and the exclusive bit (E) of FIG. 2 are combined to detect and recover the error in the exclusive bit.

The validity of the exclusive bit (E) is guaranteed by the majority logic or ECC (error checking and correcting) circuit to detect and recover the error in the change bit (C).

In the above embodiments, the combination of the change bit (C) and the exclusive bit (E) is used. As shown in Table 2, there is also an impossible combination of the validity bit (V) which indicates the validity of the directory entry and the change bit (C).

TABLE 2

| Change Bit C | Validity Bit V | |
|---|---|---|
| | "0" Entry is invalid | "1" Entry is valid |
| "0" (no write) | o | o |
| "1" (write) | x | o | x . . . Impossible combination

An error in which the validity bit V is "0" indicating the invalidity of the entry in spite of the fact that data has been written into cache or buffer storage (C="1")

can be processed by a circuit which is similar to the error detection and recovery circuit shown in FIG. 2. In store-in type and store-through type systems, an error may be detected if a copy of the line is not present in the buffer storage of another processor with respect to the data for the invalid directory (V="0") between the V bit and the E bit. The change bit guarantee circuit or validity guarantee circuit and the majority logic circuit or ECC circuit may be similar to those shown in FIGS. 1 to 3.

In the above embodiments, intermittent failure due to radiation of an α-ray or noise error in a directory IC chip can be detected and recovered.

If solid failure in the directory IC chip has been detected and it has been recovered by the error recovery circuit and then the error at the same address is detected, the presence thereof is determined and it is reported to the processor system so that an alarm signal may be issued to take appropriate measures before the error affects a wider area in the directory IC chip.

The unauthorized combinations of the validity bit (V), change bit (C) and exclusive bit (E) detected as the error of the directory of the buffer storage, in the store-in system and store-through system, are (V=0, E=1), (V=0, C=1) and (C=1, E=0). If the validity of one of the bits of the combination is guaranteed, the other bit is inverted to recover the error. If (o, 1, x) or (o, x, 1), where x is any value, is detected in the combination of the three bits V, C and E, then V is corrected to "1" if E=1 or C=1 is guaranteed.

I claim:

1. A buffer control apparatus for controlling a buffer storage in each of a plurality of processors sharing a main storage by use of control means, said apparatus comprising:
    (a) a cache storage for storing data therein;
    (b) a cache directory connected to the cache storage having a plurality of entries corresponding to line positions of the cache storage;
    each of said entries storing a validity bit, a main storage address, an exclusive bit for indicating whether the line is occupied or not, and a change bit for indicating whether data has been written into the line or not; and
    (c) means for checking validity of one of the validity bit, the change bit and the exclusive bit based on a content of others of the validity bit, the change bit and the exclusive bit than the one, said means for checking being arranged to receive the one from the cache directory.

2. A buffer control apparatus according to claim 1 further comprising means for correcting the content of said one bit based on the content of another bit when said one bit is in error.

3. A buffer control apparatus according to claim 2 further comprising means for guaranteeing the correctness of one of the validity bit, change bit and exclusive bit.

4. A buffer control apparatus according to claim 3 wherein said guarantee means is a majority logic circuit which receives an odd number of change bits or exclusive bits and products a logical value representing the majority of "0" and "1" bits.

5. A buffer control apparatus according to claim 4 further comprising a gate logic circuit connected to the output of said guarantee means for correcting that bit of the validity bit, exclusive bit and change bit which has not been applied to said guarantee means.

6. A multiprocessor system having a plurality of processors sharing a main storage, each of said processors comprising:
    (a) a cache storing having individual line positions for storing data therein;
    (b) cache directories connected to said cache storage and provided one for each line of said cache storage,
    (c) said cache directories each having a plurality of bits for holding information relating to memory contents of the lines;
    (d) guarantee means being arranged to accept at least one of the plurality of bits, for guaranteeing the value of one of the plurality of bits; and
    (e) means for receiving an output of said guarantee means for correcting other of the plurality of bits.

7. A multiprocessor system according to claim 6 wherein said correction means includes means for detecting an unauthorized combination of bits.

8. A buffer control apparatus for use in a system having a plurality of processors sharing a main storage, each of the processors having a buffer memory including selected line positions for storing data, and a buffer directory connected to the buffer storage, the buffer directory having a plurality of entries corresponding to the line positions of the buffer storage, each of the entries storing a plurality of bits including a validity bit, a main storage address, an exclusive bit for indicating whether the line is occupied, and a change bit for indicating whether data has been written into the line, the buffer control apparatus comprising:
    a guarantee means for guaranteeing a value of a one of the plurality of bits;
    a detecting means for detecting a predetermined impossible combination of the change bit and the exclusive bit, wherein detection indicates an error in the value of a bit other than the one that is guaranteed; and,
    a correcting means for correcting the error in the bit not guaranteed that is received from the buffer directory whereby an error in the exclusive or change bits can be detected and corrected in a single manner.

* * * * *